Oct. 17, 1967    E. T. JAGGER ETAL    3,347,554
SHAFT SEALS
Filed Sept. 8, 1965
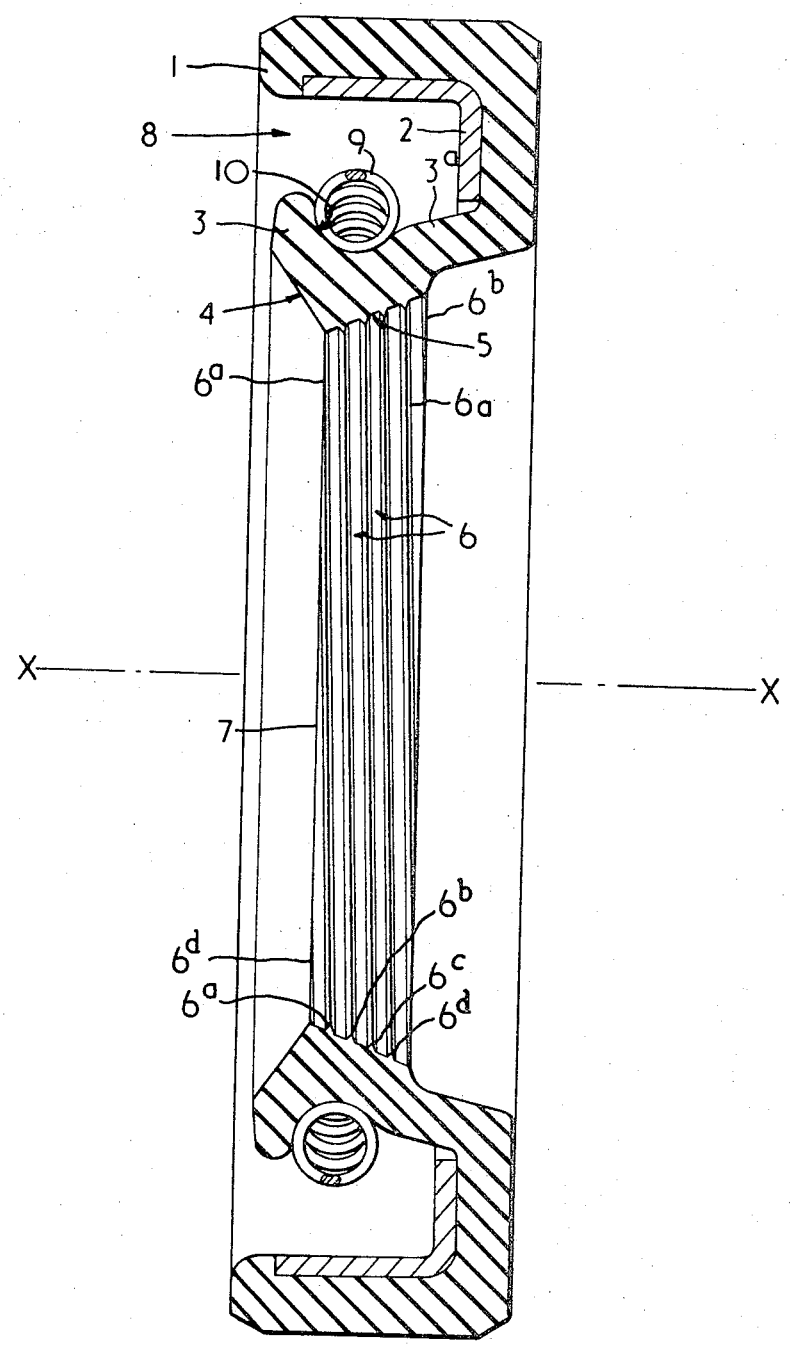

United States Patent Office 3,347,554
Patented Oct. 17, 1967

3,347,554
SHAFT SEALS
Ernest T. Jagger and Geoffrey W. Halliday, Newcastle-upon-Tyne, England, assignors to George Angus & Company Limited, Newcastle-upon-Tyne, England, a British company
Filed Sept. 8, 1965, Ser. No. 485,709
Claims priority, application Great Britain, Sept. 24, 1964, 38,936/64
3 Claims. (Cl. 277—134)

This invention relates to shaft seals for sealing, against oil leakage, the ends of engine crankshafts, especially the rear, or drive transmission, end of an automotive engine crankshaft which has long presented a difficult sealing problem.

Difficulty in sealing the ends of a crankshaft is inherent in the function of the crankshaft which, due to its shape and intermittent loading, must be subjected to deflections and torsional oscillations so that the ends of the crankshaft cannot maintain a constant co-axial relationship with a surrounding seal.

Engine design is also an important factor affecting crankshaft seals, particularly as regards access and drainage of oil to and from the seals and mounting or housing of the seals.

The present invention is concerned with lip-type shaft seals, i.e. rubber ring seals which each have a flange which bears as a sealing lip around the shaft. The invention is based on a study of the problem of crankshaft sealing and how the problem can be met by lip seals.

The study has shown that a lip seal for a crankshaft should meet the following requirements:

(a) The seal lip must be made as flexible as possible by selecting as soft a material as other considerations will permit and making the web of the lip flange relatively long and of a cross-section to permit flexing.

(b) The lip loading, i.e. its contact pressure on the shaft, should be obtained from the force applied by the usual garter spring, rather than by constriction due to the elasticity of the rubber itself, and the stretch to which the spring is subjected in use should be only a small proportion of its extensibility, say not more than 5%. In other words, care must be taken that lip loading is not achieved at the expense of flexibility.

(c) The rubber of the ring must be heat-resistant, as well as oil-resistant, because of the high temperature to which a crankshaft seal is subjected at high speed.

(d) Sealing due to wiping contact of the lip on the shaft should be supplemented by some form of feed-back scroll or return screw for oil tending to escape past the sealed periphery.

To meet the above requirements there is provided, according to the invention, an engine crankshaft seal consisting of a circular ring moulded from a heat-resistant and oil-resistant synthetic rubber, the ring having a co-axial annular channel defined by an outer holding annulus, stiffened by a rigid ring insert, and an inner annular flange including a flexible web portion and having a circumferential groove seating for a garter spring in the channel, the inner periphery of the flange having a sealing lip formed by two frusto-conical surfaces of the flange converging towards the axis of the ring to define an inner circumferential lip edge and the frusto-conical surface further from the channel having moulded therein a multi-start screw thread which meets the lip edge at two or more points and of which more than two crests are intersected by any radial section axially through the ring.

Further features of the invention are included in the following description of an example of a seal in accordance with the invention and shown in axial section by the accompanying drawing.

The drawing shows a circular seal ring moulded from synthetic rubber and having an outer holding annulus 1, stiffened by an L-section metal ring insert 2, and an inner flange 3 comprising a flexible web portion 3$^a$ and a sealing lip formed by two convergent frusto-conical surfaces 4 and 5.

The lip surface 5 is moulded with a multi-start screw thread, generally indicated as 6, of substantially triangular cross-sectional tooth form. The screw thread meets, at several points, an inner circumferential lip edge 7 defined by the surfaces 4 and 5 converging towards the axis X—X of the seal ring.

Between the annulus 1 and flange 3, within the channel 8 which they define, a garter spring 9 is seated in a circumferential groove 10 in the outer periphery of the flange 3. The medial transverse plane of the groove 10 intersects the surface 5 and the groove 10 is itself intersected by the plane of the lip edge 7. This arrangement is designed to achieve optimum loading of the flange 3 by the garter spring 9.

As is well-known, a multi-start screw thread consists of a series of parallel helical thread portions, called "starts," and in the seal illustrated the screw thread 6 has four starts 6$^a$, 6$^b$, 6$^c$ and 6$^d$.

Two of the starts, 6$^a$ and 6$^d$, can be seen meeting the lip edge 7 and any radial section axially through the ring, such as the two radial sections shown respectively at the top and bottom of the drawing, intersects the crests of all the starts.

We have found that, for efficient sealing, there should be at least two starts of the screw thread, to meet the lip edge 7 at two or more points, and the number and helical length of the starts should be sufficient for more than two crests of the screw thread to be intersected by a radial section axially through the ring. The crests of the screw thread represent the effective portions of the screw thread which feed back oil on relative rotation of the crankshaft journal and also form supplementary sealing lips, rather like labyrinth grooves, against oil leakage under static conditions. A succession of more than two crests across the leakage path for oil has been found necessary for good sealing under both running and static conditions.

The screw thread should not have more than twenty starts because, within the usual dimensions for crankshaft seals, with a greater number of starts the helical length of each start can only be small and the starts cannot overlap enough to provide an effective series of screw thread crests across the oil leakage path, particularly under static conditions.

The seal is made in accordance with the requirements set out above as regards the flexibility of the sealing lip and the lip loading by the garter spring.

The synthetic rubber from which the seal is made, or at least the flexible flange portion thereof, preferably has a hardness of between 65° and 70° Shore A and the preferred material is a silicone synthetic rubber such as a methyl vinyl polysiloxane compounded with fillers and curing agents. Polyacrylic and nitrile rubbers and other plastics with suitable properties may however be used, e.g. butadiene acrilonitrile co-polymers, fluoroelastomers, such as a co-polymer of hexafluoropropylene and vinylidene fluoride, and silicone elastomers.

With some synthetic rubbers, the above preferred range of hardness could be varied.

We claim:

1. In an engine crankshaft seal comprising a circular ring moulded from a heat-resistant and oil-resistant synthetic rubber, said ring having an outer annular portion and an inner annular flange defining between them an annular channel co-axial with the axis of said ring, said flange having a flexible web portion and a circumferential groove in a surface of said flange in said channel, a garter spring seated in said groove, and the inner periphery of said flange having two frusto-conical surfaces coaxial with and converging towards said axis and meeting at a circumferential lip edge; the improvement which consists in a multi-start screw thread moulded in that one of said frusto-conical surfaces which is further from said channel, said multi-start screw thread consisting of a plurality of parallel helical thread portions, at least two of said thread portions meeting said lip edge and said thread portions having crests of which at least three crests would be intersected by any radial section axially through said ring.

2. A seal according to claim 1, wherein the medial transverse plane of said groove intersects said one frusto-conical surface having said multi-start screw thread.

3. A seal according to claim 1, wherein the plane of said lip edge intersects said groove.

References Cited

UNITED STATES PATENTS 2,446,380   8/1948   Meyers et al. _____ 277—134 X

FOREIGN PATENTS 889,198   1/1962   Great Britain.

SAMUEL ROTHBERG, *Primary Examiner.*